Patented Sept. 2, 1941

2,255,032

UNITED STATES PATENT OFFICE 2,255,032

SOLIDIFIED PEANUT BUTTER

Henry Weisgurt and Dale R. van Horn, Lincoln, Nebr.; said van Horn assignor to said Weisgurt No Drawing. Application January 6, 1939, Serial No. 249,608

1 Claim. (Cl. 99—128)

The invention relates to peanut butter, its primary object being the provision of a peanut butter which is more convenient to handle and to consume than the prior peanut butter, and in which the cost of packaging is reduced to a minimum.

Another of our objects is the provision of a peanut butter in a form such that in eating the peanut butter, it will not cling to the roof of the mouth.

Another of our objects is the provision of peanut butter having a range of consistencies as that of a dairy butter, which may be readily spread on bread, to that of hard sausage, which may be eaten out of hand in the sliced form.

Another object which we have in view is the provision of a peanut butter which is in a much more convenient form than the prior peanut butter, but which may be dispensed to the consumer at actually decreased cost because the product can be packed in Cellophane instead of glass jars.

Another of our objects is the provision of a peanut butter which will not stratify.

Still another of our objects is the provision of a peanut butter having a filler or binder which does not alter the flavor or color or odor of the peanut butter.

More specifically, our object is the provision of an organic filler or binder for peanut butter, to solidify the peanut butter without altering the flavor or color or odor of the peanut butter.

In preparing our peanut butter, we start with a peanut butter which has been prepared by any of the methods now in use and which are all well known to all manufacturers of peanut butter. We treat such peanut butter with a waxy ingredient to harden the butter to the desired consistency. The ingredient must be relatively tasteless and colorless and odorless so as not to impart a foreign taste or odor to the peanut butter.

While several waxes and oils give greater or less success, we have found that the use of what is known in the trade as mineral beeswax gives the best results thus far obtained. The mineral beeswax is a by-product of the petroleum industry and it resembles the paraffin waxes in several respects. In other respects it differs very markedly from the paraffins. It appears to be amorphous whereas the paraffins are crystalline. The former is obtained from the heavy motor oils and steam cylinder oils while the paraffins are separated out from the lighter oils. While either the waxes or the paraffins will harden the peanut butter, the waxes are the better for our purpose since the paraffins are relatively brittle and result in a crumbly form of peanut butter. On the other hand, the waxes not only harden the peanut butter but they cause the particles of the butter to adhere to each other, resulting in a homogeneous form of peanut butter having the consistencies necessary for spreading or slicing, as desired. Neither the mineral beeswax nor the paraffin waxes enter into the digestive processes.

The proportion of the wax to the peanut butter necessarily depends on the consistency desired, the season of the year, and on a number of other factors. For summer weather, more wax should be used than in winter to obtain hardness in the same degree. If the peanut butter is intended to be packaged and marketed like dairy butter, less wax is required than if the peanut butter is to be sold and eaten like hard sausage. The peanut butter and the mineral beeswax are mixed with each other under the application of moderate heat and agitation. The heat of a water bath is sufficient for softening both ingredients sufficiently for stirring with a paddle.

The mineral beeswax is commercially obtainable in several grades, varying chiefly in color. The colors vary from light or practically white to amber. Owing to the fact that the amber grade has substantially the color of peanut butter, we prefer this grade since it leaves the peanut butter with its color unchanged. The mineral beeswax is not sticky or tacky so that the treated peanut butter is smooth as velvet and more tasty.

While the peanut butter as above described is intended for use as a food to be eaten like butter or sausage, uses of a much wider range will be apparent to manufacturers of food products. For example, the addition of sugar or milk or chocolate will result in very palatable candies which will appeal to children but which do not leave a disturbing after effect on the child's digestion. In confectionaries, the solidified peanut butter may be made to serve as either a coating or a filler. Since the flavor of peanut butter is not affected in any way by the presence of the mineral beeswax, the mixture is admirably adapted to receive any of the various flavoring materials used in the making of confections.

Having thus described our invention in such full, clear, and exact terms that its composition and utility will be readily understood by others skilled in the art to which it pertains, what we claim as new and desire to secure by Letters Patent of the United States is:

A semi-solid peanut butter containing a tasteless and odorless petroleum wax as a filler and binder, said wax having a color resembling the color of peanut butter.

HENRY WEISGURT.
DALE R. VAN HORN.